US011230274B2

(12) United States Patent
Cho

(10) Patent No.: US 11,230,274 B2
(45) Date of Patent: Jan. 25, 2022

(54) VEHICULAR INTEGRATED BRAKING SYSTEM

(71) Applicants: HYUNDAI MOTOR COMPANY, Seoul (KR); KIA MOTORS CORPORATION, Seoul (KR)

(72) Inventor: Jae Seol Cho, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 400 days.

(21) Appl. No.: 16/363,682

(22) Filed: Mar. 25, 2019

(65) Prior Publication Data

US 2020/0164846 A1    May 28, 2020

(30) Foreign Application Priority Data

Nov. 28, 2018    (KR) .......................... 10-2018-0149847

(51) Int. Cl.
*B60T 13/26*    (2006.01)
*B60T 13/68*    (2006.01)
*B60T 17/22*    (2006.01)
*B60T 17/04*    (2006.01)

(52) U.S. Cl.
CPC .......... *B60T 13/261* (2013.01); *B60T 13/683* (2013.01); *B60T 17/04* (2013.01); *B60T 17/221* (2013.01); *B60T 2270/402* (2013.01); *B60T 2270/88* (2013.01)

(58) Field of Classification Search
CPC ...... B60T 13/683; B60T 13/261; B60T 17/04; B60T 17/221; B60T 2270/402; B60T 2270/88
See application file for complete search history.

(56) References Cited

U.S. PATENT DOCUMENTS

| | | | | |
|---|---|---|---|---|
| 4,003,605 A * | 1/1977 | Fannin | ................... | B60T 13/261 303/9.76 |
| 5,823,638 A * | 10/1998 | Sich | ....................... | B60T 13/665 303/22.1 |
| 5,833,325 A * | 11/1998 | Hart | ....................... | B60T 8/1893 303/7 |
| 6,206,487 B1 * | 3/2001 | Nakamura | ............ | B60T 8/3605 137/102 |
| 2006/0232125 A1 * | 10/2006 | Thomas | ................... | B60T 13/38 303/7 |
| 2007/0262637 A1 * | 11/2007 | Bennett | ................. | B60T 13/662 303/3 |
| 2019/0001947 A1 * | 1/2019 | Lowe | .................... | G01S 13/867 |

FOREIGN PATENT DOCUMENTS

KR    1020050049619    5/2005

* cited by examiner

*Primary Examiner* — Vishal R Sahni
(74) *Attorney, Agent, or Firm* — Lempia Summerfield Katz LLC

(57) ABSTRACT

A vehicular integrated brake system has an EBS and an EPB system integrated in the system to simplify a brake control system and reduce costs. An EBS function and an EPB function are incorporated by adding an EPB valve in the EBS valve system, so that the actuation of the EBS valves and the EPB valve can be controlled by a single integrated controller. A separate pneumatic route connecting the EPB is removed to optimize the pneumatic route. Thus, it is possible to simplify the controller and to reduce costs.

11 Claims, 3 Drawing Sheets

VEHICULAR INTEGRATED BRAKING SYSTEM

CROSS REFERENCE TO RELATED APPLICATION

The present application claims priority to and the benefit of Korean Patent Application No. 10-2018-0149847 filed on Nov. 28, 2018, the entire contents of which is incorporated herein for all purposes by this reference.

BACKGROUND

1. Technical Field

The present disclosure relates to a vehicular integrated brake system, in which an Electric Brake System (EBS) and an Electronic Parking Brake (EPB) system are integrated to simplify a brake control system and reduce costs.

2. Description of the Related Art

An Electronic Parking Brake (EPB) system electromagnetically operates a parking brake. The actuation of an EPB valve is controlled by a parking brake actuation signal transmitted from an EPB controller to generate braking force in the parking brake or to release braking force from the parking brake.

An Electric Brake System (EBS) implements functions, such as ABS and ASR. The actuation of an EBS valve is controlled by a brake pedal operation signal transmitted from an EBS controller to control the braking pressure of a brake cylinder.

In other words, the EBS and the EPB are very similar to each other in terms of brake control, but the EBS and the EPB are separately operated in a pneumatic brake system. Valves and controllers are separately configured. Accordingly, there is a disadvantage in terms of material costs and the number of operation steps.

It should be understood that the foregoing description of the background art is merely for the purpose of promoting the understanding of the background of the present disclosure and should not be accepted as acknowledging that the background art is known to those having ordinary skill in the art.

SUMMARY

The present disclosure has been made in order to solve the problems described above and provides a vehicular integrated brake system, in which an EBS and an EPB system are integrated to simplify a brake control system and to reduce costs.

In view of the problems described above, a configuration of the present disclosure may include an EBS system configured to generate braking force of a main brake by causing compressed air delivered from an air tank to be introduced into or discharged from a main brake chamber by selectively actuating a plurality of EBS valves in response to an operation signal of a brake pedal. The configuration may include an EPB valve configured to receive the compressed air delivered from the air tank and to pass or block the compressed air by being selectively actuated in response to an operation signal of a parking brake. The configuration may include a parking brake chamber configured to generate braking force of the parking brake when the compressed air is introduced into or discharged therefrom through the EPB valve. The configuration may include an exhaust port configured to exhaust the compressed air discharged from the main brake chamber and the compressed air discharged from the parking brake chamber. The configuration may include a check valve provided on an air line, in which the EBS valves, the EPB valve, and the exhaust port meet each other. The air line may be configured to allow only a flow of the compressed air discharged from the EBS valves to the exhaust port and a flow of the compressed air discharged from the EPB valve to the exhaust port. The configuration may include a controller configured to receive the operation signal of the brake pedal and the operation signal and of the parking brake so as to control turning-ON/OFF of the plurality of EBS valves and the EPB valve.

The EBS valve may include a first EBS valve connected to the air tank and configured to be turned ON/OFF, a second EBS valve connected to the first EBS valve and the check valve and configured to be turned ON/OFF, and a relay valve connected to the air tank, the first EBS valve, the second EBS valve, the main brake chamber, and the check valve and configured to be actuated by turning-ON the first EBS valve. The EPB valve may be connected to the air tank, the parking brake chamber, and the check valve. The check valve may be connected to the relay valve, the EPB valve, the second EBS valve, and the exhaust port.

The first EBS valve may be a two-port, two-position solenoid valve having a first port connected to the air tank and a second port connected to the relay valve. The second EBS valve may be a two-port, two-position solenoid valve having a first port connected to the relay valve and a second port connected to the check valve. The relay valve may have a first port connected to the air tank, a second port connected to the second port of the first EBS valve and the first port of the second EBS valve, a third port connected to an input/output port of the main brake chamber, and a fourth port connected to the check valve. The EPB valve may be a three-port, two-position solenoid valve having a first port connected to the air tank, a second port connected to the input/output port of the parking brake chamber, and a third port connected to the check valve. The check valve may have a first input port connected to the second port of the second EBS valve, a second input port connected to the fourth port of the relay valve, a third input port connected to the third port of the EPB valve, and an output port connected to the exhaust port.

The vehicular integrated brake system may further include a main air supply line connected at one end thereof to the air tank, branched in a middle portion thereof, and connected at a remaining end thereof to each of the first port of the first EBS valve, the first port of the relay valve, and the first port of the EPB valve. The integrated brake system may further include a first EBS air line connected at one end thereof to the second port of the first EBS valve, branched in a middle portion thereof, and connected at a remaining end thereof to each of the first port of the second EBS valve and the second port of the relay valve. The integrated brake system may further include a second EBS air line connected at one end thereof to the third port of the relay valve, and connected at a remaining end thereof to the input/output port of the main brake chamber. The integrated brake system may further include a third EBS air line connected at one end thereof to the second port of the second EBS valve and connected at a remaining end thereof to the first input port of the check valve. The integrated brake system may further include a first EPB air line connected at one end thereof to the second port of the EPB valve and connected at a remaining end thereof to the input/output port of the parking brake chamber. The integrated brake system may further include a second EPB air line connected at one end thereof to the third port of the EPB valve and connected at a remaining end thereof to the second input port of the check valve. The integrated brake system may further include an exhaust air line connected at one end thereof to the output port of the check valve and connected at a remaining end thereof to the exhaust port.

The vehicular integrated brake system may further include a back-up EBS valve connected between a brake cylinder connected to the brake pedal and the relay valve so as to be turned ON/OFF.

The vehicular integrated brake system may further include a pressure sensor connected to the third port of the relay valve.

Through the configuration described above, the present disclosure incorporates an EBS function and an EPB function by adding an EPB valve in the EBS valve system. Thus, the actuation of the EBS valves and the EPB valve can be controlled by a single integrated controller and a separate pneumatic route connecting the EPB is removed to optimize the pneumatic route. Accordingly, it is possible to simplify the controller and to reduce costs.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EMBODIMENTS

Hereinafter, embodiments of the present disclosure are described in detail with reference to the accompanying drawings.

A vehicular integrated brake system of the present disclosure has a structure in which an EPB system is added in an EBS system to control a main brake and a parking brake PB together in a single brake system. The vehicular integrated brake system generally includes the EBS system, an EPB valve 60, a parking brake chamber 70, an exhaust port 80, and a check valve 90.

Figure 1:
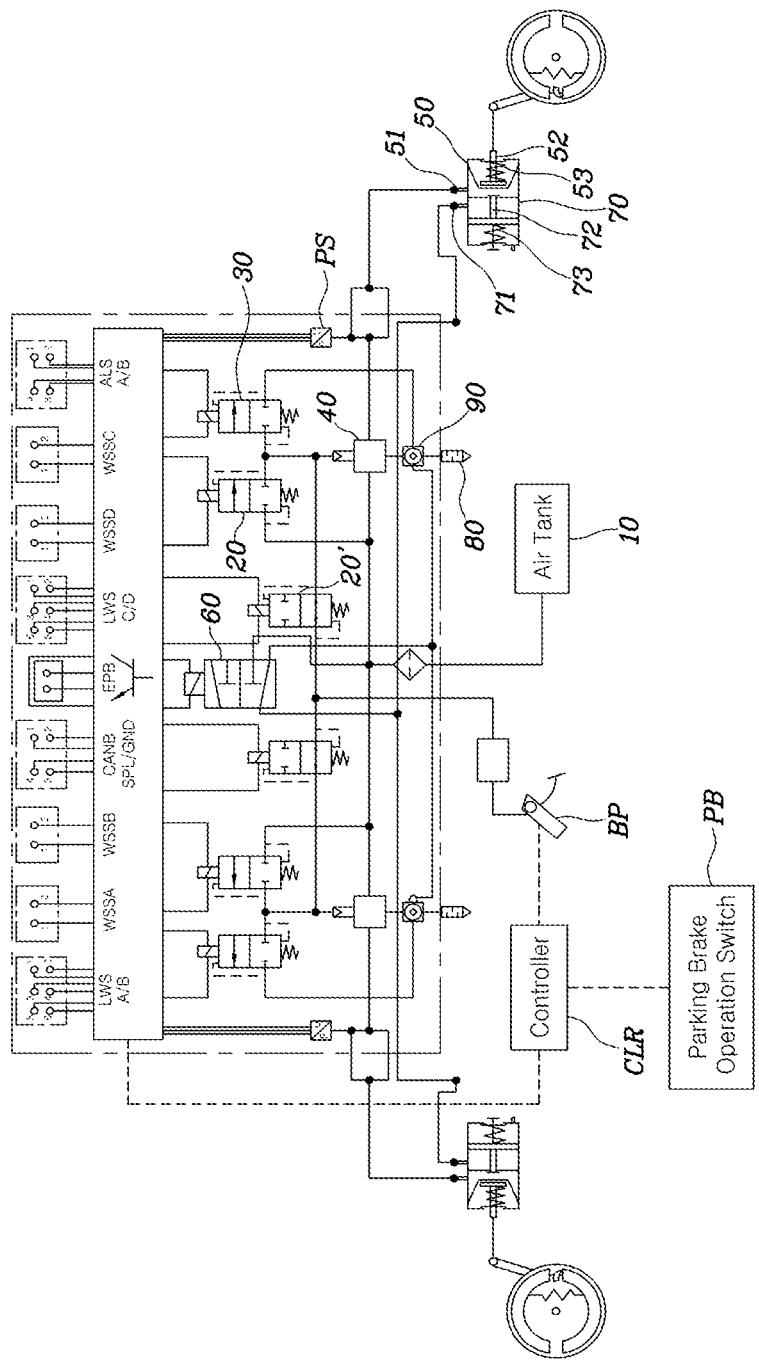
FIG. 1 is a pneumatic circuit diagram of an integrated brake system according to an embodiment of the present disclosure.

Referring to FIG. 1, the present disclosure is described in detail. First, in the EBS system, a plurality of EBS valves are selectively actuated according to an operation signal of a brake pedal BP. This causes compressed air, which is delivered from an air tank 10, to be introduced into or discharged from the main brake chamber 50 to generate the braking force of the main brake.

For example, the main brake chamber 50 is provided with a main actuation rod 52, which is operated to be linearly displaced by compressed air, and a return spring 53, which provides elastic restoration force to the main actuation rod 52.

When the brake pedal BP is stepped on and compressed air flows into the main brake chamber 50, the main brake is actuated while the main actuation rod 52 is moved. When the foot is released from the brake pedal BP and compressed air is discharged from the main brake chamber 50, the main actuation rod 52 is restored and moved by the elastic restoration force of the return spring 53, thereby releasing the actuation of the main brake.

In addition, the EPB valve 60 is supplied with compressed air from the air tank 10 and is selectively actuated in response to an operation signal of the parking brake PB, thereby passing or blocking the compressed air.

The compressed air is introduced into or discharged from the parking brake chamber 70 through the EPB valve 60 to generate the braking force of the parking brake.

For example, the parking brake chamber 70 may be fixed to one side of the main brake chamber 50 and provided with a parking actuation rod 72. The parking actuation rod 72 is actuated to be linearly displaced by the compressed air A return spring 73 is configured to provide elastic restoration force to the parking actuation rod 72.

During the restoration operation of the return spring 73, the parking actuation rod 72 pushes the main actuation rod 52, so that the brake can be actuated by the main actuation rod 52.

That is, when the parking brake PB is operated to be released, the compressed air is introduced into the parking brake chamber 70 This causes the parking actuation rod 72 to be linearly moved in the direction away from the main actuation rod 52, thereby releasing the actuation of the parking brake PB.

In contrast, when the parking brake PB is operated to be actuated, the compressed air in the parking brake chamber 70 is discharged. This causes the parking actuation rod 72 to be straightly moved toward the main actuation rod 52 by the elastic restoration force of the return spring 73, thereby pushing the main actuation rod 52 in the actuation direction to actuate the parking brake PB.

In addition, the exhaust port 80 exhausts the compressed air discharged from the main brake chamber 50 and the compressed air discharged from the parking brake chamber 70.

The check valve 90 is provided on the air line where the EBS valves and the EPB valve 60 are connected to the exhaust port 80 to allow only the flow of the compressed air discharged from the EBS valves to the exhaust port 80 and the flow of the compressed air discharged from the EPB valve 60 to the exhaust port 80.

In addition, the present disclosure may further include a controller CLR that receives an operation signal of the brake pedal BP and an operation signal of the parking brake PB to control the turning-ON/OFF of the EBS valves and the EPB valve 60.

By adding the EPB valve 60 in the EBS valve system to integrate the EBS function and the EPB function, the actuation of the EBS valves and the EPB valve 60 are controlled through a single integrated controller CLR. Accordingly, it is possible to simplify the controller and to remove a separate pneumatic route connecting the EPB, thereby optimizing the pneumatic route.

Referring to FIG. 1, valves controlled through the controller CLR and the connection relationship of the valves are described. First, the EBS valves include a first EBS valve 20, a second EBS valve 30, and a relay valve 40.

For example, the EBS valves include a first EBS valve 20 connected to the air tank and configured to be turned ON/OFF. The EBS valves include a second EBS valve 30 connected to the first EBS valve 20 and the check valve 90 and configured to be turned ON/OFF. The EBS valves include a relay valve 40 connected to the air tank 10, the first EBS valve 20, the second EBS valve 30, the main brake chamber 50, and the check valve 90. The relay valve 40 is configured to be actuated in response to the turning-ON of the first EBS valve 20.

The EPB valve 60 is connected to the air tank 10, the parking brake chamber 70, and the check valve 90.

The check valve 90 is connected to the relay valve 40, the EPB valve 60, the second EBS valve 30, and the exhaust port 80.

Figure 2:
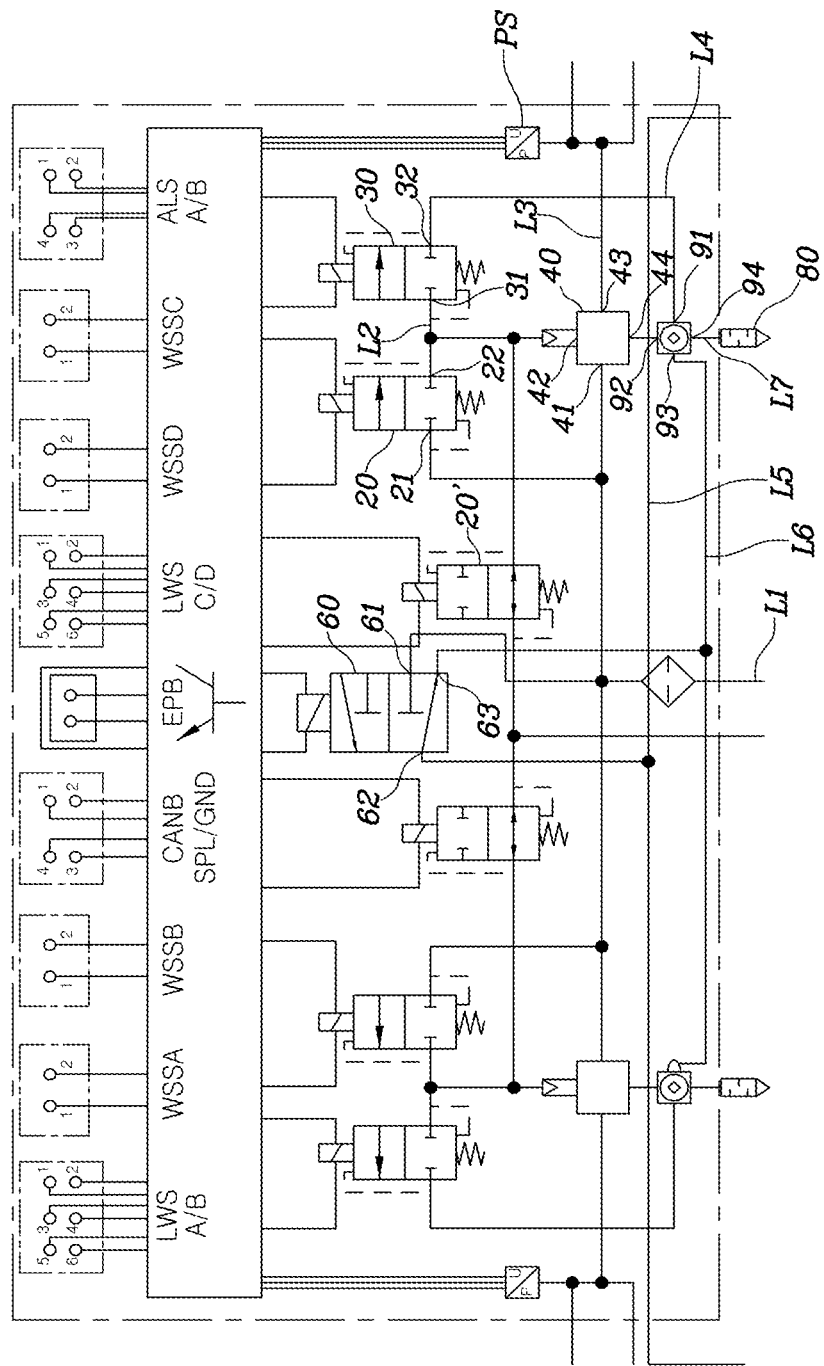
FIG. 2 is an enlarged view of a part of the pneumatic circuit of FIG. 1.

Referring to FIGS. 1 and 2, connection structures of these valves are described in detail. First, the first EBS valve 20 is a two-port, two-position solenoid valve in which a first port 21 is connected to the air tank 10 and a second port 22 is connected to the relay valve 40.

The second EBS valve 30 is a two-port, two-position solenoid valve in which the first port 31 is connected to the relay valve 40 and the second port 32 is connected to the check valve 90.

The relay valve 40 has a first port 41 connected to the air tank 10. The relay valve has a second port 42 connected to the second port 22 of the first EBS valve 20 and the first port 31 of the second EBS valve 30. The relay valve 40 has a third port 43 connected to an input/output port 51 of the main brake chamber 50. The relay valve 40 has a fourth port 44 connected to the check valve 90.

The EPB valve 60 is a three-port, two-position solenoid valve in which a first port 61 is connected to the air tank 10, a second port 62 is connected to the input/output port 71 of the parking brake chamber 70, and a third port 63 is connected to the check valve 90.

The check valve 90 has a first input port 91 connected to the second port 32 of the second EBS valve 30. The check valve 90 has a second input port 92 connected to the fourth port 44 of the relay valve 40. The check valve 90 has a third input port 93 connected to the third port 63 of the EPB valve 60. The check valve 90 has an output port 94 connected to the exhaust port 80.

Further, in the present disclosure, the ports formed in the valves may be connected through air lines.

Referring to the drawings, first, a main air supply line L1 is connected at one end thereof to the air tank 10, branched at the middle portion thereof, and connected at the other end thereof to each of the first port 21 of the first EBS valve 20, the first port 41 of the relay valve 40, and the first port 61 of the EPB valve 60.

A first EBS air line L2 is connected at one end thereof to the second port 22 of the first EBS valve 20, branched at the middle portion thereof, and connected at the other end thereof to each of the first port 31 of the second EBS valve 30 and the second port 42 of the relay valve 40.

A second EBS air line L3 is connected at one end thereof to the third port 43 of the relay valve 40 and connected at the other end thereof to the input/output port 51 of the main brake chamber 50.

A third EBS air line L4 is connected at one end thereof to the second port 32 of the second EBS valve 30 and connected at the other end to the first input port 91 of the check valve 90.

A first EPB air line L5 is connected at one end thereof to the second port 62 of the EPB valve 60 and connected at the other end thereof to the input/output port 71 of the parking brake chamber 70.

A second EPB air line L6 is connected at one end thereof to the third port 63 of the EPB valve 60 and connected at the other end thereof to the second input port 92 of the check valve 90.

An exhaust air line L7 is connected at one end thereof to the output port 94 of the check valve 90 and connected at the other end thereof to the exhaust port 80.

According to such a configuration, when the driver steps on the brake pedal BP, a brake-ON signal is applied to the controller CLR. When the first EBS valve 20 is turned ON and the second EBS valve 30 is turned OFF, the compressed air in the air tank 10 passes through the first EBS valve 20 and is delivered to the second port 42 of the relay valve 40, thereby actuating the piston of the relay valve 40.

The compressed air in the air tank 10 passes through the third port 43 of the relay valve 40 through the first port 41 of the relay valve 40 and flows into the main brake chamber 50 through the second EBS air line L3, thereby activating the main brake.

In contrast, when the driver releases his/her foot from the brake pedal BP, a brake-OFF signal is applied to the controller CLR. The first EBS valve 20 is turned OFF and the second EBS valve 30 is turned ON. The compressed air introduced into the main brake chamber 50 is discharged and introduced into the third port 43 of the relay valve 40. The compressed air introduced into the third port 43 of the relay valve 40 is discharged through the fourth port 44 of the relay valve 40 and exhausted to the exhaust port 80.

In addition, the compressed air used for actuating the relay valve 40 is introduced into the first input port 91 of the check valve 90 through the second EBS valve 30. The introduced compressed air is exhausted through the output port 94 of the check valve 90 and the exhaust port 80.

Meanwhile, as illustrated in FIG. 1, since the first port 61 of the EPB valve 60 is blocked during the parking mode of the parking brake PB, the compressed air in the air tank 10 cannot pass through the EPB valve 60. The second port 62 of the EPB valve 60 is connected to the parking brake chamber 70. The third port 63 of the EPB valve 60 is connected to the third input port 93 of the check valve 90. The compressed air is thereby prevented from flowing back to the EPB valve 60 from the second EBS valve 30. Accordingly, the inside of the parking brake chamber 70 is maintained at atmospheric pressure and the compressed air is removed. The parking brake PB can be actuated by the elastic restoration force of the return spring 73 provided in the parking brake chamber 70.

Figure 3:
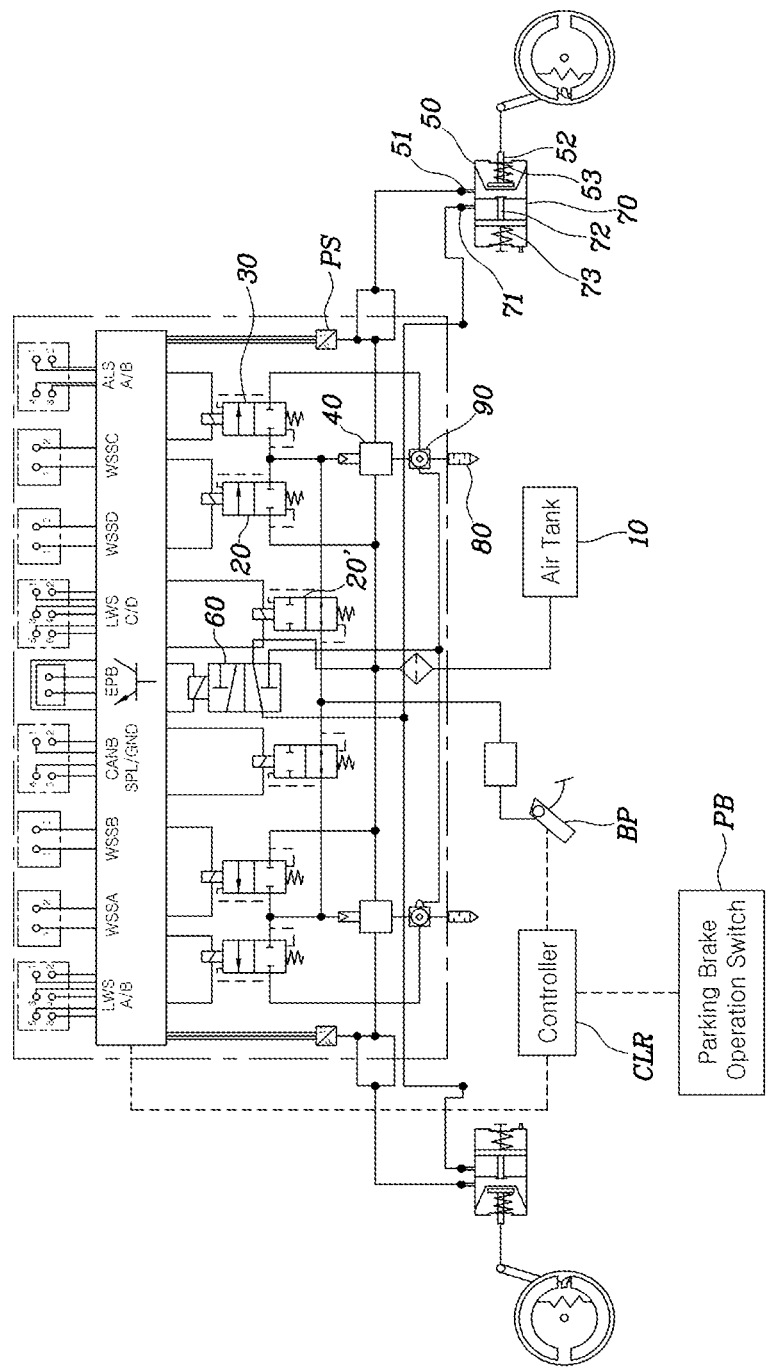
FIG. 3 is a view for explaining the state in which an EPB valve according to an embodiment of the present disclosure is actuated.

In contrast, when the parking brake PB is released as illustrated in FIG. 3, the EPB valve 60 is turned ON by the controller CLR. The compressed air in the air tank 10 flows into the parking brake chamber 70 through the first port 61 of the EPB valve 60 and the second port 62 of the EPB valve 60, thereby compressing the return spring 73 in the parking brake chamber 70, which causes the activation of the parking brake PB to be released.

When the main brake is actuated by operating the brake pedal BP at this time point, the compressed air in the main brake chamber 50 is exhausted through the exhaust port 80 in response to the actuation of the first EBS valve 20 and the second EBS valve 30 when the actuation of the main brake is released. The third input port 93 of the check valve 90 prevents the compressed air from flowing back toward the EPB valve 60, thereby preventing the compressed air, which has actuated the main brake, from flowing into the EPB valve 60.

That is, under the actuation signal-OFF condition of the EPB valve 60, the port connected to the parking brake chamber 70 is connected to the atmosphere and the port connected to the air tank 10 is blocked, thereby bringing the parking brake PB into the state in which the parking brake PB is actuated.

In contrast, under the actuation signal-ON condition of the EPB valve 60, the compressed air of the air tank 10 is supplied to the parking brake chamber 70 through the EPB valve 60 and the port of the EPB valve connected to the check valve 90 is blocked, thereby bringing the parking brake PB into the state in which the actuation of the parking brake PB is released.

The present disclosure may further include a back-up EBS valve 20' connected between the brake cylinder connected to the brake pedal BP and the relay valve 40 to be turned ON/OFF.

For example, when the driver steps on the brake pedal BP but the electric signal of the controller CLR fails, the compressed air is delivered to the backup EBS valve 20' through the brake cylinder. The relay valve 40 can thus be actuated by the air pressure provided by the back-up EBS valve 20'.

However, when the electric signal of the controller CLR is normal, the compressed air is delivered to the backup EBS valve 20', and at the same time, the back-up EBS valve 20' is actuated so as to block the air pressure delivered to the back-up EBS valve 20'. The main brake is actuated through the actuation of the first EBS valve 20 and the second EBS valve 30 described above. This configuration allows for quick brake reaction and pressure control by the electrical control of the first EBS valve 20 and the second EBS valve 30.

Further, in the present disclosure, a pressure sensor PS may be connected to the third port 43 of the relay valve 40.

The pressure of the main brake chamber 50 may be adjustable to become the optimum pressure according to deceleration of the vehicle through the first EBS valve 20, the second EBS valve 30, and the relay valve 40 together with the pressure sensor PS.

As described above, the present disclosure incorporates an EBS function and an EPB function by adding an EPB valve 60 in the EBS valve system. Thus, the actuation of the EBS valves and the EPB valve 60 can be controlled by a single integrated controller CLR. A separate pneumatic route connecting the EPB is removed to optimize the pneumatic route. Thus, the controller can be simplified, and costs can be reduced.

While the present disclosure has been described in detail only with reference to embodiments shown and described herein, it will be evident to those having ordinary skill in the art that various changes and modifications can be made within the scope of the technical idea of the present disclosure. Such modifications and changes belong to the scope of the accompanying claims.

What is claimed is:

1. A vehicular integrated brake system comprising:
   an electric brake system (EBS) system configured to generate a braking force of a main brake by causing compressed air delivered from an air tank to be introduced into or discharged from a main brake chamber by selectively actuating a plurality of EBS valves in response to an operation signal of a brake pedal;
   an electric parking brake (EPB) valve configured to receive the compressed air delivered from the air tank and to pass or block the compressed air by being selectively actuated in response to an operation signal of a parking brake;
   a parking brake chamber configured to generate a braking force of the parking brake when the compressed air is introduced into or discharged therefrom through the EPB valve;
   an exhaust port configured to exhaust the compressed air discharged from the main brake chamber and the compressed air discharged from the parking brake chamber;
   a check valve provided on an air line, in which the plurality of EBS valves, the EPB valve, and the exhaust port meet each other, and the check valve configured to allow only a flow of the compressed air discharged from the plurality of EBS valves to the exhaust port and a flow of the compressed air discharged from the EPB valve to the exhaust port; and
   a controller configured to receive the operation signal of the brake pedal and the operation signal of the parking brake so as to control turning-ON/OFF of the plurality of EBS valves and the EPB valve.

2. The vehicular integrated brake system of claim 1, wherein the plurality of EBS valves include:
   a first EBS valve connected to the air tank and configured to be turned ON/OFF;
   a second EBS valve connected to the first EBS valve and the check valve and configured to be turned ON/OFF; and
   a relay valve connected to the air tank, the first EBS valve, the second EBS valve, the main brake chamber, and the check valve and configured to be actuated by turning-ON of the first EBS valve,
   wherein the EPB valve is connected to the air tank, the parking brake chamber, and the check valve, and
   wherein the check valve is connected to the relay valve, the EPB valve, the second EBS valve, and the exhaust port.

3. The vehicular integrated brake system of claim 2, wherein the first EBS valve is a two-port, two-position solenoid valve having a first port connected to the air tank and a second port connected to the relay valve,
   wherein the second EBS valve is a two-port, two-position solenoid valve having a first port connected to the relay valve and a second port connected to the check valve,
   wherein the relay valve has a first port connected to the air tank, a second port connected to the second port of the first EBS valve and the first port of the second EBS valve, a third port connected to an input/output port of the main brake chamber, and a fourth port connected to the check valve,
   wherein the EPB valve is a three-port, two-position solenoid valve having a first port connected to the air tank, a second port connected to an input/output port of the parking brake chamber, and a third port connected to the check valve, and
   wherein the check valve has a first input port connected to the second port of the second EBS valve, a second input port connected to the fourth port of the relay valve, a third input port connected to the third port of the EPB valve, and an output port connected to the exhaust port.

4. The vehicular integrated brake system of claim 3, further comprising:
   a main air supply line connected at one end thereof to the air tank, branched in a middle portion thereof, and connected at a remaining end thereof to each of the first port of the first EBS valve, the first port of the relay valve, and the first port of the EPB valve;
   a first EBS air line connected at one end thereof to the second port of the first EBS valve, branched in a middle portion thereof, and connected at a remaining end thereof to each of the first port of the second EBS valve and the second port of the relay valve;

a second EBS air line connected at one end thereof to the third port of the relay valve and connected at a remaining end thereof to the input/output port of the main brake chamber;
a third EBS air line connected at one end thereof to the second port of the second EBS valve and connected at a remaining end thereof to the first input port of the check valve;
a first EPB air line connected at one end thereof to the second port of the EPB valve and connected at a remaining end thereof to the input/output port of the parking brake chamber;
a second EPB air line connected at one end thereof to the third port of the EPB valve and connected at a remaining end thereof to the second input port of the check valve; and
an exhaust air line connected at one end thereof to the output port of the check valve and connected at a remaining end thereof to the exhaust port.

5. The vehicular integrated brake system of claim 2, further comprising:
a back-up EBS valve connected between a brake cylinder connected to the brake pedal and the relay valve so as to be turned ON/OFF.

6. The vehicular integrated brake system of claim 3, further comprising:
a pressure sensor connected to the third port of the relay valve.

7. A vehicular integrated brake system comprising:
an electric brake system (EBS) system configured to generate a braking force of a main brake by causing compressed air delivered from an air tank to be introduced into or discharged from a main brake chamber by selectively actuating a plurality of EBS valves in response to an operation signal of a brake pedal;
an electric parking brake (EPB) valve configured to receive the compressed air delivered from the air tank and to pass or block the compressed air by being selectively actuated in response to an operation signal of a parking brake;
a parking brake chamber configured to generate a braking force of the parking brake when the compressed air is introduced into or discharged therefrom through the EPB valve;
an exhaust port configured to exhaust the compressed air discharged from the main brake chamber and the compressed air discharged from the parking brake chamber; and
a check valve provided on an air line, in which the plurality of EBS valves, the EPB valve, and the exhaust port meet each other, and the check valve configured to allow only a flow of the compressed air discharged from the plurality of EBS valves to the exhaust port and a flow of the compressed air discharged from the EPB valve to the exhaust port,
wherein the plurality of EBS valves include
a first EBS valve connected to the air tank and configured to be turned ON/OFF,
a second EBS valve connected to the first EBS valve and the check valve and configured to be turned ON/OFF, and
a relay valve connected to the air tank, the first EBS valve, the second EBS valve, the main brake chamber, and the check valve and configured to be actuated by turning-ON of the first EBS valve,
wherein the EPB valve is connected to the air tank, the parking brake chamber, and the check valve, and
wherein the check valve is connected to the relay valve, the EPB valve, the second EBS valve, and the exhaust port.

8. The vehicular integrated brake system of claim 7, wherein the first EBS valve is a two-port, two-position solenoid valve having a first port connected to the air tank and a second port connected to the relay valve,
wherein the second EBS valve is a two-port, two-position solenoid valve having a first port connected to the relay valve and a second port connected to the check valve,
wherein the relay valve has a first port connected to the air tank, a second port connected to the second port of the first EBS valve and the first port of the second EBS valve, a third port connected to an input/output port of the main brake chamber, and a fourth port connected to the check valve,
wherein the EPB valve is a three-port, two-position solenoid valve having a first port connected to the air tank, a second port connected to an input/output port of the parking brake chamber, and a third port connected to the check valve, and
wherein the check valve has a first input port connected to the second port of the second EBS valve, a second input port connected to the fourth port of the relay valve, a third input port connected to the third port of the EPB valve, and an output port connected to the exhaust port.

9. The vehicular integrated brake system of claim 8, further comprising:
a main air supply line connected at one end thereof to the air tank, branched in a middle portion thereof, and connected at a remaining end thereof to each of the first port of the first EBS valve, the first port of the relay valve, and the first port of the EPB valve;
a first EBS air line connected at one end thereof to the second port of the first EBS valve, branched in a middle portion thereof, and connected at a remaining end thereof to each of the first port of the second EBS valve and the second port of the relay valve;
a second EBS air line connected at one end thereof to the third port of the relay valve and connected at a remaining end thereof to the input/output port of the main brake chamber;
a third EBS air line connected at one end thereof to the second port of the second EBS valve and connected at a remaining end thereof to the first input port of the check valve;
a first EPB air line connected at one end thereof to the second port of the EPB valve and connected at a remaining end thereof to the input/output port of the parking brake chamber;
a second EPB air line connected at one end thereof to the third port of the EPB valve and connected at a remaining end thereof to the second input port of the check valve; and
an exhaust air line connected at one end thereof to the output port of the check valve and connected at a remaining end thereof to the exhaust port.

10. The vehicular integrated brake system of claim 7, further comprising:
a back-up EBS valve connected between a brake cylinder connected to the brake pedal and the relay valve so as to be turned ON/OFF.

11. The vehicular integrated brake system of claim 8, further comprising:

a pressure sensor connected to the third port of the relay valve.

* * * * *